United States Patent
Kim et al.

(10) Patent No.: US 12,034,149 B2
(45) Date of Patent: Jul. 9, 2024

(54) POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

(71) Applicant: Samsung SDI Co., Ltd., Yongin-si (KR)

(72) Inventors: Sungsoo Kim, Yongin-si (KR); Donghyun Kil, Yongin-si (KR)

(73) Assignee: Samsung SDI Co., Ltd., Yongin-si (KR)

( * ) Notice: Subject to any disclaimer, the term of this patent is extended or adjusted under 35 U.S.C. 154(b) by 430 days.

(21) Appl. No.: 16/777,744

(22) Filed: Jan. 30, 2020

(65) Prior Publication Data
US 2020/0251724 A1   Aug. 6, 2020

(30) Foreign Application Priority Data
Feb. 1, 2019 (KR) .................. 10-2019-0014092

(51) Int. Cl.
*H01M 4/36* (2006.01)
*H01M 4/02* (2006.01)
(Continued)

(52) U.S. Cl.
CPC .......... *H01M 4/364* (2013.01); *H01M 4/366* (2013.01); *H01M 4/505* (2013.01); *H01M 4/525* (2013.01);
(Continued)

(58) Field of Classification Search
CPC ...... H01M 4/364; H01M 4/366; H01M 4/505; H01M 4/525; H01M 4/62;
(Continued)

(56) References Cited

U.S. PATENT DOCUMENTS

2006/0051671 A1   3/2006   Thackeray et al.
2008/0311473 A1   12/2008   Sasaoka et al.
(Continued)

FOREIGN PATENT DOCUMENTS

CN   101080830 A   11/2007
CN   103606674 A   2/2014
(Continued)

OTHER PUBLICATIONS

Kim et al. ("Composite 'Layered-Layered-Spinel' Cathode Structures for Lithium-Ion Batteries", Journal of The Electrochemical Society, 160 (1) A31-A38 (2013)) (Year: 2013).*

(Continued)

*Primary Examiner* — Matthew T Martin
*Assistant Examiner* — Taylor Harrison Krone
(74) *Attorney, Agent, or Firm* — Lewis Roca Rothgerber Christie LLP

(57) ABSTRACT

A positive active material for a rechargeable lithium battery includes a lithium nickel-based composite oxide and a lithium manganese composite oxide, wherein the positive active material includes a surface-modifying layer including lithium fluoride on the surface of at least one of the lithium nickel-based composite oxide and the lithium manganese composite oxide. The lithium nickel-based composite oxide includes a secondary particle in which a plurality of plate-shaped primary particles are agglomerated, and the secondary particle has a regular array structure in which (003) planes of the plurality of primary particles are aligned or oriented normal to the surface of the secondary particle. The lithium manganese composite oxide is present in two or more types of crystal lattice structures.

19 Claims, 7 Drawing Sheets

(51) Int. Cl.
*H01M 4/505* (2010.01)
*H01M 4/525* (2010.01)
*H01M 4/62* (2006.01)
*H01M 10/0525* (2010.01)

(52) U.S. Cl.
CPC ......... *H01M 4/62* (2013.01); *H01M 10/0525* (2013.01); *H01M 2004/021* (2013.01); *H01M 2004/028* (2013.01)

(58) Field of Classification Search
CPC ..... H01M 410/0525; H01M 2004/021; H01M 2004/028; H01M 10/0525
See application file for complete search history.

(56) References Cited

U.S. PATENT DOCUMENTS

| | | | |
|---|---|---|---|
| 2010/0167078 A1 | 7/2010 | Kim et al. | |
| 2011/0311869 A1 | 12/2011 | Oh et al. | |
| 2012/0112139 A1 | 5/2012 | Chang et al. | |
| 2012/0261610 A1* | 10/2012 | Paulsen ................ | H01M 4/505 252/182.1 |
| 2012/0282522 A1 | 11/2012 | Axelbaum et al. | |
| 2012/0292561 A1 | 11/2012 | Sasaoka et al. | |
| 2013/0078518 A1* | 3/2013 | Thackeray ............ | H01M 4/366 429/223 |
| 2014/0038052 A1 | 2/2014 | Song et al. | |
| 2014/0057175 A1 | 2/2014 | Chung et al. | |
| 2014/0065483 A1 | 3/2014 | Park et al. | |
| 2014/0162119 A1 | 6/2014 | Takei et al. | |
| 2015/0016024 A1 | 1/2015 | Choi et al. | |
| 2015/0147651 A1 | 5/2015 | Hong et al. | |
| 2015/0147655 A1 | 5/2015 | Park et al. | |
| 2015/0171423 A1 | 6/2015 | Kim et al. | |
| 2015/0243971 A1 | 8/2015 | Cho et al. | |
| 2015/0287984 A1 | 10/2015 | Kong et al. | |
| 2016/0043396 A1 | 2/2016 | Sakai et al. | |
| 2016/0211517 A1 | 7/2016 | Beck et al. | |
| 2016/0372748 A1 | 12/2016 | Nakayama et al. | |
| 2017/0179470 A1* | 6/2017 | Choi ..................... | H01M 4/485 |
| 2017/0194637 A1 | 7/2017 | Ahn et al. | |
| 2017/0271653 A1* | 9/2017 | Yamauchi ............. | H01M 4/525 |
| 2017/0338488 A1 | 11/2017 | Sun et al. | |
| 2018/0026267 A1 | 1/2018 | Kim et al. | |
| 2018/0026268 A1* | 1/2018 | Kim ..................... | C01G 53/006 429/223 |
| 2018/0145324 A1 | 5/2018 | Liu et al. | |
| 2018/0151876 A1 | 5/2018 | Kim et al. | |
| 2018/0159128 A1 | 6/2018 | Kim et al. | |
| 2018/0166687 A1 | 6/2018 | Chang et al. | |
| 2018/0212237 A1 | 7/2018 | Lee et al. | |
| 2019/0173076 A1 | 6/2019 | Kim et al. | |
| 2019/0260024 A1* | 8/2019 | Nakamura ............. | C01G 53/50 |
| 2019/0288285 A1* | 9/2019 | Kim ..................... | H01M 4/505 |
| 2019/0326596 A1 | 10/2019 | Yun et al. | |
| 2021/0020980 A1* | 1/2021 | Miura ................ | H01M 10/0568 |
| 2021/0193999 A1* | 6/2021 | Omae ................ | C01G 45/1228 |

FOREIGN PATENT DOCUMENTS

| | | |
|---|---|---|
| CN | 105609718 A | 5/2016 |
| CN | 105958062 A | 9/2016 |
| CN | 106784659 A | 5/2017 |
| CN | 106848241 A | 6/2017 |
| CN | 107644982 A | 1/2018 |
| CN | 108075111 A | 5/2018 |
| DE | 102017201313 A1 | 8/2018 |
| EP | 2744021 A1 | 6/2014 |
| EP | 3272710 | 1/2018 |
| EP | 3331065 | 6/2018 |
| EP | 3 550 640 A1 | 10/2019 |
| EP | 3 550 641 A1 | 10/2019 |
| EP | 3 550 643 A1 | 10/2019 |
| JP | 2008-204806 A | 9/2008 |
| JP | 2017-162614 A | 9/2017 |
| JP | 2018-014325 A | 1/2018 |
| KR | 10-2010-0076824 A | 7/2010 |
| KR | 10-1034227 B1 | 5/2011 |
| KR | 10-2011-0097719 A | 8/2011 |
| KR | 10-2014-0018628 A | 2/2014 |
| KR | 10-2014-0025793 A | 3/2014 |
| KR | 10-2014-0058800 A | 5/2014 |
| KR | 10-2015-0008308 A | 1/2015 |
| KR | 10-2015-0026864 A | 3/2015 |
| KR | 10-2015-0061474 A | 6/2015 |
| KR | 10-2015-0070853 A | 6/2015 |
| KR | 10-2015-0100406 A | 9/2015 |
| KR | 10-2016-0026402 A | 3/2016 |
| KR | 10-2016-0083638 A | 7/2016 |
| KR | 10-2017-0078892 A | 7/2017 |
| KR | 10-2017-0079942 A | 7/2017 |
| KR | 10-2017-0124202 A | 11/2017 |
| KR | 10-2018-0010122 A | 1/2018 |
| KR | 10-2018-0010123 A | 1/2018 |
| KR | 10-2018-0062429 A | 6/2018 |
| KR | 10-2018-0063849 A | 6/2018 |
| KR | 10-2018-0063857 A | 6/2018 |
| KR | 10-2018-0063858 A | 6/2018 |
| KR | 10-2018-0063859 A | 6/2018 |
| KR | 10-2018-0063860 A | 6/2018 |
| KR | 10-2018-0065944 A | 6/2018 |
| KR | 10-2019-0065963 A | 6/2019 |
| KR | 10-2019-0092281 A | 8/2019 |
| WO | WO 2011-089958 A1 | 7/2011 |
| WO | WO 2018-020845 A1 | 2/2018 |
| WO | WO 2018-137942 A1 | 8/2018 |

OTHER PUBLICATIONS

Park et al. ("Cycle mechanism and electrochemical properties of lithium manganese oxide prepared using different Mn sources", Materials Chemistry and Physics 112 (2008) 696-701) (Year: 2008).*
Meng, Yujia, et al., "Synthesis of LiMn2O4 Nano-wires via Flux Method and Their Usage as Cathode Material for Lithium Ion Batteries," Chemical Research in Chinese Universities, 2015, vol. 31, No. 5, pp. 820-824.
Korean Office Action dated Mar. 23, 2021, issued in Korean Patent Application No. 10-2019-0146078 (7 pages).
Korean Office Action dated Mar. 30, 2021, issued in Korean Patent Application No. 10-2019-0147179 (8 pages).
Office Action dated Oct. 26, 2020, of the corresponding Japanese Patent Application No. 2019-207057 (5 pages).
Office Action dated Oct. 26, 2020, of the corresponding Japanese Patent Application No. 2019-206253 (5 pages).
EPO Extended Search Report dated Apr. 23, 2020, corresponding to European Patent Application No. 19208992.8 (6 pages).
EPO Extended Search Report dated May 6, 2020, corresponding to European Patent Application No. 19209524.8 (5 pages).
Yu et al. , "Nanofibers of LiMn2O4 by electrospinning", Journal of Colloid and Interface Science, ISSN: 0021-9797, vol. 285, Issue: 1, p. 163-166 (Year: 2005).
U.S. Restriction Requirement dated Oct. 27, 2021, issued in U.S. Appl. No. 16/684,057 (7 pages).
U.S. Notice of Allowance dated Jan. 18, 2022, issued in U.S. Appl. No. 16/682,907 (7 pages).
U.S. Office Action dated Jan. 20, 2022, issued in U.S. Appl. No. 16/684,057 (23 pages).
Bohang Song, et al., "A facile cathode design combining Ni-rich layered oxides with Li-rich layered oxides for lithium-ion batteries", Journal of Power Sources, vol. 325, Sep. 1, 2016, pp. 620-629.
U.S. Office Action dated Sep. 15, 2021, issued in U.S. Appl. No. 16/682,907 (10 pages).
Thackeray, Michael M., et al., "Advances in manganese-oxide 'composite' electrodes for lithium-ion batteries," Journal of Materials Chemistry, 2005, vol. 15, pp. 2257-2267.
Chinese Office Action, with English translation, dated Sep. 15, 2021, issued in corresponding Chinese Patent Application No. 202010078888.6 (27 pages).

(56) References Cited

OTHER PUBLICATIONS

Chinese Office Action dated Sep. 18, 2021, issued in Chinese Patent Application No. 201911111056.3 (21 pages).
Korean Office Action dated Sep. 27, 2021, issued in corresponding Korean Patent Application No. 10-2019-0014092 (6 pages).
Extended European Search Report for corresponding European Patent Application No. 20154668.6, dated Jul. 1, 2020, 9 pages.
Kim, Dongham et al., "Composite 'Layered-Layered-Spinel' Cathode Structures for Lithium-Ion Batteries", Journal of The Electrochemcal Society, Nov. 6, 2012, pp. 31-38.
West, W.C. et al., "Preparation of high quality layered-layered composite Li2MnO3—LiMo2 (M=Ni, Mn, Co) Li-ion cathodes by a ball milling-annealing process", Journal of Power Sources, Elsevier SA, CH, vol. 204, Jan. 1, 2012, pp. 200-204.
Xi, Liujiang et al., "Layered Li2MnO3.3LINi0.5—xMn0.5—xCo2xO2 microspheres with Mn-rich cores as high performance cathode materials for lithium ion batteries", Physical Chemistry Chemical Physics, vol. 15, No. 39, Jan. 1, 2013, pp. 16579-16585.
Notice of Allowance for U.S. Appl. No. 16/682,907 dated Mar. 10, 2022, 7 pages.
Office Action for Chinese Application No. CN201911111056.3 dated Mar. 23, 2022, 9 pages.
Office Action for Chinese Application No. CN202010078888.6 dated Mar. 28, 2022, 6 pages.
U.S. Notice of Allowance dated Jun. 27, 2022, issued in U.S. Appl. No. 16/682,907 (5 pages).
U.S. Final Office Action dated Jul. 7, 2022, issued in U.S. Appl. No. 16/684,057 (24 pages).
Chinese Office Action, with English translation, dated Sep. 14, 2022, issued in Chinese Patent Application No. 201911112652.3 (15 pages).
U.S. Advisory Action dated Sep. 29, 2022, issued in U.S. Appl. No. 16/684,057 (3 pages).
U.S. Office Action dated Dec. 22, 2022, issued in U.S. Appl. No. 16/684,057 (24 pages).
Chinese Office, with English translation, Action dated Mar. 31, 2023, issued in Chinese Patent Application No. 201911112652.3 (11 pages).
EPO Office Action dated Jul. 28, 2023, issued in European Patent Application No. 19208992.8 (4 pages).

* cited by examiner

POSITIVE ACTIVE MATERIAL FOR RECHARGEABLE LITHIUM BATTERY, METHOD OF PREPARING THE SAME AND RECHARGEABLE LITHIUM BATTERY INCLUDING THE SAME

CROSS-REFERENCE TO RELATED APPLICATION

This application claims priority to and the benefit of Korean Patent Application No. 10-2019-0014092, filed in the Korean Intellectual Property Office on Feb. 1, 2019, the entire content of which is incorporated herein by reference.

BACKGROUND

1. Field

One or more aspects of example embodiments of the present disclosure are related to a positive active material for a rechargeable lithium battery, a method of manufacturing the same, and a rechargeable lithium battery including the same.

2. Description of the Related Art

As portable electronic devices, communication devices, and the like are developed, rechargeable lithium batteries having higher energy densities are desired.

An example rechargeable lithium battery includes a positive electrode and a negative electrode, each of which may include an electrode active material layer including an electrode active material, formed on an electrode current collector. The positive active material may be a material for intercalating lithium ions, and may be or include an oxide (such as lithium cobalt oxide ($Li_xCoO_2$), lithium nickel oxide ($Li_xNiO_2$), lithium nickel cobalt oxide ($Li_x(NiCo)O_2$), lithium nickel cobalt manganese oxide ($Li_x(NiCoMn)O_2$), spinel-type lithium manganese oxide ($Li_xMn_2O_4$), and manganese dioxide ($MnO_2$)), an olivine-type or NASICON-type phosphate (such as lithium iron phosphate ($Li_xFePO_4$), lithium manganese phosphate ($Li_xMnPO_4$), and the like), a silicate, a polymer material, and/or the like.

The negative electrode active material may be a compound capable of intercalating lithium ions, and may be or include lithium metal or an alloy thereof, a polymer material, or a carbon material, for example, a graphite-based material (such as artificial or natural graphite, and/or the like), non-graphitizable carbon, graphitizable carbon, carbon nanotubes (CNT), carbon nanofibers (CNF), and/or carbon nanowalls (CNW).

However, a lithium nickel-based composite oxide (included in the positive active material) may generate a relatively increased amount of gas during high temperature storage, due to unreacted residual lithium that is produced during synthesis of the positive active material. Battery swelling may thus occur, resulting in degradation of cycle-life characteristics. Therefore, a method for removing unreacted residual lithium is desired.

SUMMARY

One or more aspects of example embodiments of the present disclosure are directed toward a positive active material for a rechargeable lithium battery having improved charge and discharge capacity, efficiency, and/or cycle-life characteristics by improving lithium diffusion (e.g., lithium diffusion rates) during charge and discharge, mitigating stress due to volume changes, and reducing (e.g., decreasing) unreacted residual lithium.

One or more aspects of example embodiments of the present disclosure are directed toward a method of preparing the positive active material for a rechargeable lithium battery.

One or more aspects of example embodiments of the present disclosure are directed toward a rechargeable lithium battery including the positive active material for a rechargeable lithium battery.

One or more example embodiments of the present disclosure provide a positive active material for a rechargeable lithium battery including a lithium nickel-based composite oxide and a lithium manganese composite oxide, and a surface-modifying layer including lithium fluoride on the surface of at least one of the lithium nickel-based composite oxide and the lithium manganese composite oxide, the lithium nickel-based composite oxide including a secondary particle in which a plurality of plate-shaped primary particles are agglomerated, the secondary particle having a regular array structure in which (003) planes of the primary particles are oriented normal to an outer surface of the secondary particle, and the lithium manganese composite oxide having two or more types of crystal lattice structures.

In some embodiments, the secondary particle may have a single-centered radial arrangement having one center, or a multi-centered radial array structure having a plurality of centers.

In some embodiments, the lithium nickel-based composite oxide may have a porosity of about 1% to about 8%.

In some embodiments, the positive active material may include about 1,000 ppm or less of unreacted residual lithium at the surface thereof. For example, the positive active material may include about 1,000 ppm or less of unreacted residual lithium at the surface of the lithium nickel-based composite oxide.

In some embodiments, the lithium nickel-based composite oxide may have a specific surface area of about 0.4 $m^2/g$ to about 1.0 $m^2/g$.

In some embodiments, the lithium manganese composite oxide may be on the surface of the lithium nickel-based composite oxide.

In some embodiments, the lithium manganese composite oxide may be an oxide represented by Chemical Formula 1:

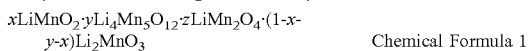

$x$LiMnO$_2$·$y$Li$_4$Mn$_5$O$_{12}$·$z$LiMn$_2$O$_4$·(1-$x$-$y$-$x$)Li$_2$MnO$_3$  Chemical Formula 1

In Chemical Formula 1, 0≤x<1, 0≤y<1, 0≤z<1, 0<y+z<1, and 0<x+y+z<1.

In some embodiments, the lithium manganese composite oxide may have a cubic crystal lattice structure and a monoclinic crystal lattice structure and optionally, an orthorhombic crystal lattice structure.

In some embodiments, the lithium manganese composite oxide having the cubic crystal lattice structure may be at least one of LiMn$_2$O$_4$ and Li$_4$Mn$_5$O$_{12}$; the lithium manganese composite oxide having the monoclinic crystal lattice structure may be Li$_2$MnO$_3$; and the lithium manganese composite oxide having the orthorhombic crystal lattice structure may be LiMnO$_2$.

In some embodiments, the lithium manganese composite oxide may have an average particle diameter (D50) of less than or equal to about 10 μm.

In some embodiments, the lithium manganese composite oxide may be included in an amount of about 0.25 mol to about 1.5 mol based on 100 mol of the lithium nickel-based composite oxide.

In some embodiments, the lithium fluoride may be present in a particle shape.

In some embodiments, the lithium fluoride may be included in an amount of about 0.25 mol to about 1.0 mol based on 100 mol of the lithium nickel-based composite oxide.

One or more example embodiments of the present disclosure provide a method of preparing the positive active material for a rechargeable lithium battery including mixing a metal hydroxide precursor and a lithium source to prepare a first mixture; first heat-treating the first mixture under a high temperature condition to prepare a first fired product including a lithium nickel-based composite oxide and residual lithium; mixing the first fired product with manganese-based oxide and a fluorine-based organic material to prepare a second mixture; and second heat-treating the second mixture to prepare the positive active material.

In some embodiments, the first heat-treating may be performed at about 750° C. to about 950° C.

In some embodiments, the manganese-based oxide may be mixed in an amount of about 0.25 to about 1.5 mol based on 100 mol of the lithium nickel-based composite oxide.

In some embodiments, the fluorine-based organic material may be mixed in an amount of about 0.25 to about 1.0 mol based on 100 mol of the lithium nickel-based composite oxide.

In some embodiments, the manganese-based oxide may be at least one selected from $Mn_2O_3$, $MnO$, and $MnO_2$.

In some embodiments, the fluorine-based organic material may be at least one selected from polyvinylidene fluoride (PVDF), polyvinyl fluoride (PVF), and polytetrafluoro ethylene (PTFE).

In some embodiments, the second mixture may further include a lithium source.

In some embodiments, the second heat-treating may be performed at about 350° C. to about 450° C.

One or more example embodiments of the present disclosure provide a rechargeable lithium battery including the positive electrode including a positive active material; a negative electrode; and an electrolyte.

The positive active material according to embodiments of the present disclosure includes a lithium nickel-based composite oxide and a lithium manganese composite oxide, and a surface-modifying layer including lithium fluoride on at least one surface thereof. Residual lithium generated during preparation of the positive active material to be present on the surface of the positive active material particle and a gas generation amount by a side reaction may thereby be reduced. Accordingly, it is possible to obtain a rechargeable lithium battery having phase stability and improved cycle-life and capacity characteristics.

DETAILED DESCRIPTION

Figure 1:
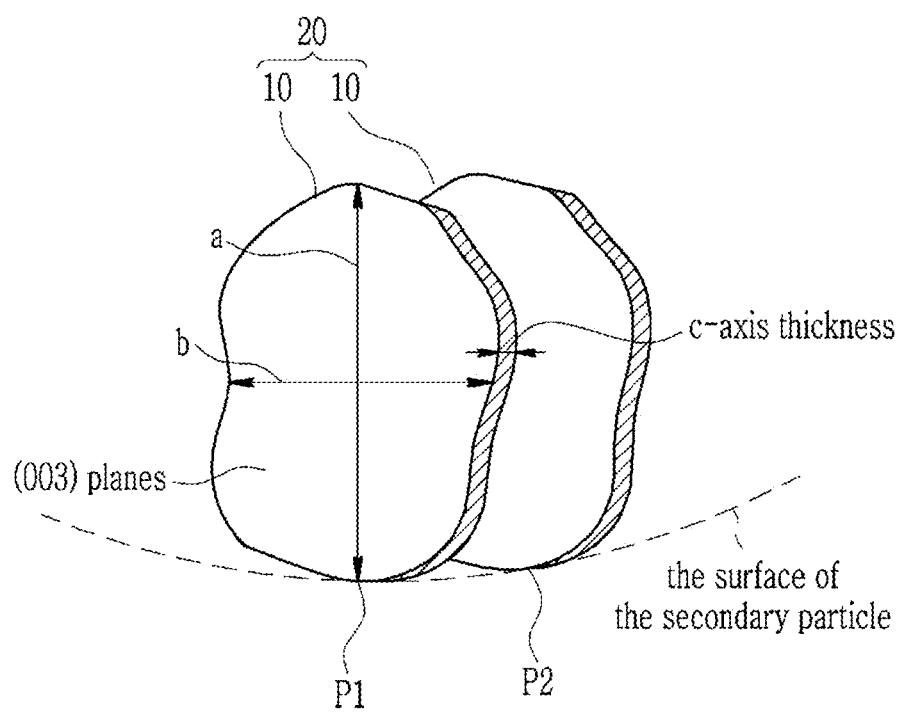
FIG. 1 is a schematic view showing oriented primary particles constituting a lithium nickel-based composite oxide, as included in the positive active material according to embodiments of the present disclosure.

Hereinafter, embodiments of the present invention are described in more detail with reference to example embodiments. However, these embodiments are examples, the present disclosure is not limited thereto and the present disclosure is defined by the scope of claims.

In the drawings, the thicknesses of layers, films, panels, regions, etc., may be exaggerated for clarity. Like reference numerals designate like elements throughout the specification, and duplicative descriptions thereof may not be provided. It will be understood that when an element such as a layer, film, region, or substrate is referred to as being "on" another element, it can be directly on the other element or intervening element(s) may also be present. In contrast, when an element is referred to as being "directly on" another element, no intervening elements are present.

Expressions such as "at least one of", "one of", "selected from", "at least one selected from", and "one selected from", when preceding a list of elements, modify the entire list of elements and do not modify the individual elements of the list. Further, the use of "may" when describing embodiments of the present disclosure refers to "one or more embodiments of the present disclosure."

A positive active material for a rechargeable battery according to an embodiment of the present disclosure includes a lithium nickel-based composite oxide and a lithium manganese composite oxide, wherein the positive active material includes a surface-modifying layer including lithium fluoride on the surface of at least one of the lithium nickel-based composite oxide and the lithium manganese composite oxide, and the lithium manganese composite oxide has (e.g., is present in) two or more types of crystal lattice structures.

The positive active material may have improved structural stability by including the surface-modifying layer. For example, cracks in the positive active material generated during the charge and discharge of a rechargeable lithium battery may be suppressed when the amount of residual lithium present inside and on the surface of the positive active material is reduced. Accordingly, gas generation may be suppressed, and the charge and discharge characteristics of the battery may be improved.

The lithium nickel-based composite oxide includes (e.g., may be in the form of) a secondary particle in which a plurality of plate-shaped primary particles are agglomerated, where the secondary particle has a regular array structure in which the (003) planes (e.g., (003) planar surfaces) of the primary particles are oriented in a vertical direction (e.g., normal) with respect to the surface (e.g., outermost surface) of the secondary particle.

Hereinafter, the lithium nickel-based composite oxide is described referring to FIG. 1.

FIG. 1 shows an example secondary particle composed of (including) two primary particles (P1 and P2), but it will be understood that three or more primary particles may be agglomerated to form secondary particles, and/or that the two particles in FIG. 1 represent a portion of an example secondary particle. Referring to FIG. 1, (003) planes of primary particles 10 are oriented in a vertical direction with respect to the surface of the secondary particle. Here, "surface" refers to an outermost surface of the secondary particle (dashed line). As used herein to describe the secondary particle, the terms "surface" and "outermost surface" may be interchangeably used to refer to the perimeter surface of the secondary particle as approximated, for example, as a sphere or ellipsoid enclosing the secondary particle. As used herein to refer to the positioning or orientation of the primary particles, the terms "vertical direction", "normal", and/or "perpendicular" may be interchangeably used to indicate that a long axis (a axis) or a short axis (b axis) of particle along the (003) plane crosses the surface of the secondary particle (e.g., crosses a plane tangent to the surface of the secondary particle at the point of intersection) at an angle of about 70° to about 110°, for example, about 80° to about 100°. When the (003) planes of the primary particles 10 are oriented so as to be perpendicular to the surface of the secondary particles 20, a relatively large number of lithium diffusion passages between boundaries (e.g., particle faces) may be formed on a shell side (e.g., on or along the outermost surface and/or portion) of the secondary particles 20, and a lithium diffusion degree (e.g., lithium diffusion rates) may be increased by externally exposing a large amount (surface area) of the crystal surface capable of lithium ion transfer, thereby securing high initial efficiency and capacity. In addition, the above-described structure may suppress or reduce stress caused by volume changes of the secondary particles 20 during charge and discharge, thereby suppressing or reducing the occurrence of cracks.

As used herein, the term "core" refers to a region of about 65% to about 85% of the length from the center to the surface of the secondary particle 20 (e.g., the inner 65% to 85% length of the radius). For example, in the lithium nickel-based oxide, the core may encompass the volume of the secondary particle except for the region within about 2 µm from the outermost surface. In addition, the term "shell" or "external part" refers to a region of about 5% to about 15% of the length from the outermost surface of the secondary particle to the center of the secondary particle 20 (e.g., the outer 5% to 15% length of the radius). For example, the shell may encompass the volume of the secondary particle within about 2 µm of the outermost surface of the lithium nickel-based oxide. The term "intermediate layer" refers to the remaining region or volume except for (e.g., not included in) the core and the shell. The orientation of primary particles 10 shown in FIG. 1 may predominantly apply to primary particles in the shells of the secondary particle 20.

The secondary particle may have a single-centered radial arrangement having one center, or a multi-centered radial array structure having a plurality of centers. In some embodiments, for example, the plurality of primary particles 10 may collectively be oriented toward (around) one center, so as to form a face contact (e.g., a plurality of interfacial contacts) in a direction along the c-axis (thickness) direction of the primary particles 10, thereby providing a secondary particle 20 having a radial array structure. In some embodiments, the secondary particle 20 may have a multi-centered radial array structure having a plurality of centers.

When the secondary particle 20 has a single-centered or multi-centered radial array structure as described above, lithium may be easily intercalated and/or deintercalated into the center(s) (e.g., interior) of the secondary particle 20.

The lithium nickel-based composite oxide may be a porous particle including a plurality of pores therein. A total porosity of the particle may be greater than or equal to about 1%, greater than or equal to about 1.5%, greater than or equal to about 2.0%, or greater than or equal to about 2.5%; and less than or equal to about 8%, less than or equal to about 7.5%, less than or equal to about 7.0%, or less than or equal to about 6.5%. The pores may effectively or suitably accommodate changes in the structure of the positive active material during charge and/or discharge.

The term "porosity" is used herein in the same sense as (e.g., used interchangeably with) the term "pore volume fraction", and is calculated as the ratio of the pore volume to the total particle volume.

The lithium nickel-based composite oxide may have a specific surface area of about 0.4 $m^2/g$ to about 1.0 $m^2/g$. When the specific surface area is within the above-described range, the cycle-life characteristics of the battery may be improved.

The specific surface area may be measured using a Brunauer-Emmett-Teller (BET) method. For example, a nitrogen gas adsorption BET 6-point method may be conducted using a porosimetry analyzer (Belsorp-II Mini, Bell Japan Inc.).

An unreacted residual lithium content present on the surface of the composite positive active material may be less than or equal to about 1,000 ppm (e.g., 1 ppm to 1,000 ppm), for example, less than or equal to about 990 ppm, less than or equal to about 980 ppm, or less than or equal to about 970 ppm.

The residual lithium content may be composed of $Li_2CO_3$ and LiOH remaining in the positive active material after synthesis. In general, a large positive active material particle size is desirable for high battery capacity, but because the specific surface area is relatively low, the rate capability and initial capacity may be decreased due to a reduction (decrease) of the active area in contact with an electrolyte solution. In order to solve this problem, the positive active material according to an embodiment of the present disclosure is a lithium nickel-based composite oxide including secondary particles in which a plurality of plate-shaped primary particles are agglomerated and arranged as described above, and thus the specific surface area thereof may be improved. However, in secondary particles having a developed surface orientation (e.g., a high degree of vertical alignment with respect to the outermost surface of the secondary particle, as described above), lithium ions may react with moisture and/or $CO_2$ in the air, and thus may easily form impurities (such as $Li_2CO_3$, LiOH, and/or the like) on the surface of the active material, which may deteriorate battery capacity or be decomposed inside a battery, thus generating gas and causing battery swelling. As such, the high temperature stability of the rechargeable battery may be deteriorated. Accordingly, the lithium manganese composite oxide and the lithium fluoride according to an embodiment of the present disclosure may be formed though a reaction of unreacted residual lithium on the surface of the secondary particles with at least one of a manganese-based oxide (e.g., $Mn_2O_3$) and a fluorine-based organic material, and may thus improve the aforementioned problem.

In addition, when the specific surface area of the nickel-based oxide having the above-described surface orientation is increased, the residual lithium may react with the electrolyte solution, moisture, or air to generate gas inside the cell, and accordingly, the cycle-life of the battery may be shortened. However, in the positive active material according to an embodiment of the present disclosure, when the residual lithium on the surface of the lithium nickel-based oxide composite oxide is removed, and the specific surface area is simultaneously (e.g., concurrently) within the above-described range, gas generation may be reduced, and the capacity and efficiency of the battery may be improved.

The positive active material according to an embodiment of the present disclosure includes the lithium manganese composite oxide having two or more types of crystal lattice structures. The lithium manganese composite oxide may be present on the surface of the lithium nickel-based composite oxide. In some embodiments, for example, the lithium manganese composite oxide may be arranged discontinuously in the shape of one or more islands on the surface of the lithium nickel-based composite oxide. In some embodiments, the lithium manganese composite oxide may form a substantially uniform and/or substantially continuous coating layer on the outer surface of the lithium nickel-based composite oxide. Further, in some embodiments when the coating layer is substantially continuous, the lithium manganese composite oxide may substantially cover the entire surface of the lithium nickel-based composite oxide. Therefore, residual lithium may be reduced and side reactions with the electrolyte solution may be suppressed, thereby reducing gas generation.

In some embodiments, the lithium manganese composite oxide may be represented by Chemical Formula 1:

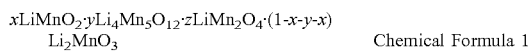
$x\text{LiMnO}_2 \cdot y\text{Li}_4\text{Mn}_5\text{O}_{12} \cdot z\text{LiMn}_2\text{O}_4 \cdot (1-x-y-x)\text{Li}_2\text{MnO}_3$   Chemical Formula 1

In Chemical Formula 1, $0 \leq x < 1$, $0 \leq y < 1$, $0 \leq z < 1$, $0 < y+z < 1$, and $0 < x+y+z < 1$.

The lithium manganese composite oxide may include or be present in two or more types of crystal lattice structures. For example, the lithium manganese composite oxide may include a cubic crystal lattice structure and a monoclinic crystal lattice structure, and optionally an orthorhombic crystal lattice structure.

The lithium manganese oxide having the cubic crystal lattice structure may be at least one of $\text{LiMn}_2\text{O}_4$ and $\text{Li}_4\text{Mn}_5\text{O}_{12}$, the lithium manganese oxide having the monoclinic crystal lattice structure may be $\text{Li}_2\text{MnO}_3$, and the lithium manganese oxide having the orthorhombic crystal lattice structure may be $\text{LiMnO}_2$.

When the lithium manganese composite oxide includes the above-described composition(s) and/or crystal lattice structure(s), the amount of residual lithium on the surface of the positive active material surface may be reduced and side reactions with an electrolyte may be suppressed, thereby reducing gas generation.

In some embodiments, the crystal lattice structure(s) of the lithium manganese composite oxide may be confirmed through transmission electron microscopy (TEM). The surface concentration(s) of elements and materials such as lithium fluoride may be measured using any suitable technique, including X-ray photoelectron spectroscopy (XPS), transmission electron microscopy, and energy dispersive X-ray spectroscopy (EDS). In addition, the amount of unreacted residual lithium on the surface of the lithium nickel-based oxide may be measured using inductively coupled plasma-atomic emission spectrometry (ICP-AES).

The lithium manganese composite oxide may have an average particle diameter (D50) of less than or equal to about 10 μm, for example, less than or equal to about 9 μm, less than or equal to about 8 μm, less than or equal to about 7 μm, or less than or equal to about 6 μm. When the average particle diameter of the lithium manganese composite oxide is within these ranges, the amounts of residual lithium and generated gas may be reduced.

The lithium manganese composite oxide may be included in an amount of greater than or equal to about 0.25 mol, for example, greater than or equal to about 0.30 mol, greater than or equal to about 0.35 mol, or greater than or equal to about 0.40 mol; and less than or equal to about 1.5 mol, for example, less than or equal to 1.4 mol, less than or equal to about 1.2 mol, less than or equal to about 1.1 mol, less than or equal to about 1.0 mol, less than or equal to about 0.9 mol, less than or equal to about 0.7 mol, or less than or equal to about 0.5 mol based on 100 mol of the lithium nickel-based composite oxide. When the mole amount of the lithium manganese composite oxide is within these ranges, the amounts of residual lithium and generated gas may be reduced. However, when the lithium manganese composite oxide is included in an excessive amount (e.g., above the described mole amount range) without a surface-modifying layer including lithium fluoride, battery capacity may be decreased, and adherence of the active material to an electrode plate may be deteriorated. For example, compared with a battery in which the lithium manganese composite oxide is used alone (e.g., without lithium fluoride), a battery using a mixture of the lithium manganese composite oxide with lithium fluoride in a relatively small amount exhibits excellent (improved) effects with respect to decreased residual lithium and decreased gas generation. Accordingly, the aforementioned battery capacity deterioration and electrode plate adherence deterioration problems may be solved.

The surface-modifying layer may include lithium fluoride. The lithium fluoride is included in the surface-modifying layer of the positive active material and thus may suppress generation of residual lithium, side reactions with an electrolyte solution, and gas generation.

The lithium fluoride may be present as a particle shape (e.g., as one or more particles). In some embodiments, the lithium fluoride may be included in an amount of greater than or equal to about 0.25 mol, for example, greater than or equal to about 0.30 mol, greater than or equal to about 0.35 mol, or greater than or equal to about 0.40 mol; and less than or equal to about 1.00 mol, less than or equal to about 0.90 mol, less than or equal to about 0.80 mol, less than or equal to about 0.70 mol, less than or equal to about 0.60 mol, or less than or equal to about 0.50 mol; for example, about 0.20 mol to about 0.50 mol based on 100 mol of the lithium nickel-based composite oxide. When the lithium fluoride is included within these content ranges, residual lithium generation and gas generation on the surface of the active material may be suppressed. However, when the lithium fluoride alone is included in an excessive (large) amount without mixing with the lithium manganese composite oxide, the high temperature cycle-life characteristics of the battery may be deteriorated, and battery resistance may be increased. For example, compared with a case in which the lithium fluoride is used alone, when the lithium fluoride is included in a positive active material as a mixture with the lithium manganese composite oxide, excellent residual lithium and gas generation-reducing effects may be obtained even when the lithium fluoride is included in a small amount, and the aforementioned high temperature cycle-life characteristics and battery resistance may be improved.

In some embodiments, the positive active material for a rechargeable lithium battery includes a lithium nickel-based composite oxide, wherein the outermost surface of secondary particles of the lithium nickel-based composite oxide are covered with lithium manganese composite oxide and lithium fluoride. In some embodiments, the lithium manganese composite oxide and lithium fluoride are mixed together. In some embodiments, for example, the lithium manganese composite oxide is deposited on the outermost surface in the shape of one or more islands, and the lithium fluoride is separately deposited on the outermost surface as one or more particles.

In some embodiments, the secondary particles of the lithium nickel-based composite oxide are covered with a lithium manganese composite oxide, and the lithium manganese composite oxide is covered with a surface-modifying layer of lithium fluoride. For example, the lithium manganese composite oxide may form a substantially continuous and/or substantially uniform coating layer, and the surface-modifying layer of lithium fluoride may form a substantially continuous and/or substantially uniform coating layer, or may be deposited as one or more particles on the lithium manganese composite oxide.

In some embodiments, the positive active material for a rechargeable lithium battery includes a lithium nickel-based composite oxide, wherein secondary particles of the lithium nickel-based composite oxide are covered with a lithium manganese composite oxide, and the lithium nickel-based composite oxide and the lithium manganese composite oxide are covered with a surface-modifying layer of lithium fluoride. For example, the lithium manganese composite oxide may be deposited in the shape of one or more islands, and the surface-modifying layer of lithium fluoride may be deposited as one or more particles over the lithium nickel-based composite oxide and the island-shape lithium manganese composite oxide.

One or more embodiments of the present disclosure provide a method of preparing the positive active material for a rechargeable lithium battery including: mixing a metal hydroxide precursor and a lithium source to prepare a first mixture; first heat-treating the first mixture under a high temperature condition to prepare a first fired product including residual lithium; mixing the first fired product with a manganese-based oxide and a fluorine-based organic material to prepare a second mixture; and second heat-treating the second mixture to prepare a second fired product.

First, the metal hydroxide precursor is prepared.

The metal hydroxide precursor may be prepared through the first, second, and third processes of forming a core, an intermediate layer, and a shell. In the first, second, and third processes, conditions such as the concentration and addition rate of a metal raw material (metal-containing raw material), the concentration and addition rate of ammonia water as a complex (complexing) agent, addition of a pH controlling agent, and/or the like may be changed or varied as described herein.

As used herein, the term "core" refers to a region corresponding to about 65% to about 85% of the length from the center toward the surface of the secondary particle 20 (e.g., the inner 65% to 85% length of the radius). For example, in the metal hydroxide precursor, the core may encompass the volume of the secondary particle except for the region within about 2 μm from the outermost surface of the metal hydroxide precursor particle. In addition, the term "shell (external part)" refers to a region of about 5% to about 15% of the length from the outermost surface of the metal hydroxide precursor particle toward the center of the metal hydroxide precursor particle (e.g., the outer 5% to 15% length of the radius). For example, in the metal hydroxide precursor according to embodiments of the present disclosure, the shell may encompass the volume within about 2 μm of the outermost surface of the metal hydroxide precursor. The term "intermediate layer" refers to the remaining region or volume except for (e.g., not included in) the core and the shell in the metal hydroxide precursor particle.

The method of preparing the positive active material according to embodiments of the present disclosure includes a first process of forming the core of the metal hydroxide precursor.

First, a complex agent and a pH controlling agent are put in a reactor, and metal raw materials are added thereto and reacted. If the pH of the reaction mixture in the reactor changes as the reaction progresses, additional amounts of the pH controlling agent may be added to the reactor to control the pH. In some embodiments, a concentration of the complex agent may be about 0.1 M to about 0.7 M, for example, about 0.2 M to about 0.5 M. The input amount (e.g., addition rate) of the complex agent may be in a range of about 8 mL/min to about 12 mL/min. The metal raw materials (e.g., lithium and transition metal-containing reactants) may have concentrations of about 0.1 M to about 0.5 M, for example, about 0.3 M. The input amounts of the metal raw materials may be in a range of about 50 mL/min to about 100 mL/min.

The method of preparing the positive active material according to embodiments of the present disclosure includes a second process of forming the intermediate layer of the metal hydroxide precursor.

The metal raw materials and the complex agent are added to the resultant of the first process to control the pH of the reaction mixture, and then, the second process is performed. For example, in the second process, the input amount and the concentration of the metal raw materials and the complex agent may be increased, relative to the conditions used in the first process, in order to prevent or slow a decrease in the growth rate of particles after reacting the product from the first process for a set or predetermined time. For example, a concentration of the complex agent may be about 0.3 M to about 1.0 M, the input amount (e.g., addition rate) of the complex agent may be about 8 mL/min to about 15 mL/min, and the metal raw materials may have concentrations of about 0.1 M to about 0.5 M, for example, about 0.3 M. The input amounts of the metal raw materials may be about 90 mL/min to about 120 mL/min.

The method of preparing the positive active material according to embodiments of the present disclosure includes a third process of forming the shell of the metal hydroxide precursor, thereby fully completing formation of the metal hydroxide precursor.

The input amounts and the concentrations of the metal raw materials and the complex agent may be further increased, relative to the second process, in order to prevent or slow a growth rate decrease of particles after reacting a reaction product from the second process for a set or predetermined time. For example, the concentration of the complex agent may be about 0.35 M to about 1.0 M, and the input amount (e.g., addition rate) of the complex agent may be about 12 mL/min to about 20 mL/min. The concentration of the metal raw materials may be about 0.1 M to about 0.5 M, for example, about 0.3 M, and the input amounts of the metal raw materials may be about 120 mL/min to about 150 mL/min. In some embodiments, the reaction conditions used in the third process may have a large influence on the surface depth of a porous layer of the metal hydroxide precursor.

The first to third processes share the following common conditions.

In each process, the agitation power may be about 0.1 kW/m$^3$ to about 6 kW/m$^3$, for example, about 1 kW/m$^3$ to about 3 kW/m$^3$. In the second and third processes, the agitation power may be decreased compared to the first process, but the agitation power of the second and third processes may be the same.

The pH of the reaction mixture may be adjusted to a range of about pH 10 to about pH 12. The pH controlling agent may control or modulate the pH of the reaction mixture to control or modulate formation of a precipitate from the reaction mixture. Non-limiting examples of the pH controlling agent may include sodium hydroxide (NaOH), sodium carbonate ($Na_2CO_3$), sodium oxalate ($Na_2C_2O_4$), and the like. In some embodiments, the pH controlling agent may be sodium hydroxide (NaOH).

The concentration of the complex agent increases sequentially from the first process, to the second process, and then the third process, and may thus range, for example, from about 0.1 M to about 0.7 M. The complex agent plays a role in controlling the rate of precipitate formation in a co-precipitation reaction. In some embodiments, the complex agent may be ammonia water and citric acid, and for example, may be ammonia water. Any suitable amount of the complex agent may be used in each process according to the principles herein.

The internal porosity of the metal hydroxide precursor particles may be affected by the reaction time of each process described above.

Since pores between (001) crystal planes are appropriately or suitably maintained due to minimized or decreased exposure of (001) crystal planes, the metal hydroxide precursor may have excellent structural stability.

The metal hydroxide precursor may be, for example, a compound represented by Chemical Formula 2:

$(Ni_{1-x-y-z}Co_xMn_yM_z)(OH)_2$    Chemical Formula 2

In Chemical Formula 2, M is one element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al), $x \le (1-x-y-z)$, $y \le (1-x-y-z)$, $0 < x < 1$, $0 \le y < 1$, and $0 \le z < 1$. In some embodiments, in Chemical Formula 2, $0 < x \le 0.33$, $0 \le y \le 0.5$, $0 \le z \le 0.05$, and $0.33 \le (1-x-y-z) \le 0.95$. In some embodiments, in Chemical Formula 2, $0.5 \le (1-x-y-z) \le 0.95$.

The metal hydroxide precursor represented by Chemical Formula 2 may be, for example, $Ni_{0.6}Co_{0.2}Mn_{0.2}(OH)_2$, $Ni_{0.5}Co_{0.2}Mn_{0.3}(OH)_2$, $Ni_{1/3}Co_{1/3}Mn_{1/3}(OH)_2$, $Ni_{0.8}Co_{0.1}Mn_{0.1}(OH)_2$, and/or $Ni_{0.85}Co_{0.1}Al_{0.05}(OH)_2$.

Hereinafter, a method of preparing the positive active material for a rechargeable lithium battery is described.

First, the metal hydroxide precursor and a lithium source are mixed to prepare a first mixture.

The lithium source may be, for example, lithium hydroxide, lithium fluoride, lithium carbonate, or a mixture thereof.

A mixing ratio of the lithium source and the metal hydroxide precursor may be stoichiometrically controlled to produce the lithium nickel-based composite oxide of Chemical Formula 3:

$Li_a(Ni_{1-x-y-z}Co_xMn_yM_z)O_2$    Chemical Formula 3

In Chemical Formula 3, $0.95 \le a \le 1.3$, $x \le (1-x-y-z)$, $y \le (1-x-y-z)$, $0 < x < 1$, $0 \le y < 1$, and $0 \le z < 1$.

In Chemical Formula 3, M is at least one element selected from boron (B), magnesium (Mg), calcium (Ca), strontium (Sr), barium (Ba), titanium (Ti), vanadium (V), chromium (Cr), iron (Fe), copper (Cu), zirconium (Zr), and aluminum (Al). In some embodiments, in Chemical Formula 3, $0.95 \le a \le 1.3$, for example, $1.0 \le a \le 1.1$; $0 < x \le 0.33$, for example, $0 < x \le 0.33$; $0 \le y \le 0.5$; $0 \le z \le 0.05$; and $0.33 \le (1-x-y-z) \le 0.95$. In some embodiments, in Chemical Formula 3, $0.5 \le (1-x-y-z) \le 0.95$.

The lithium nickel-based composite oxide of Chemical Formula 3 may be, for example, $LiNi_{0.6}Co_{0.2}Mn_{0.2}O_2$, $LiNi_{0.5}Co_{0.2}Mn_{0.3}O_2$, $LiNi_{1/3}Co_{1/3}Mn_{1/3}O_2$, $LiNi_{0.8}Co_{0.1}Mn_{0.1}O_2$, and/or $LiNi_{0.85}Co_{0.1}Al_{0.05}O_2$.

The mixing may be dry mixing, or may be performed using a mixer (e.g., a wet mixer), and/or the like. In some embodiments, the dry mixing may be performed by milling. In some embodiments, the milling may be performed so that the metal hydroxide precursor used as the starting material is hardly deformed (e.g., not subject to pulverization). For this purpose, it is necessary to control a size of the lithium source mixed with the metal hydroxide precursor in advance. The lithium source may have a size (average particle diameter) of about 5 μm to about 20 μm, for example about 10 μm. When the internal temperature of the mixer is increased above 30° C. during the above milling process, the internal temperature of the mixer may be cooled to maintain it at room temperature, 25° C.

The first mixture may be first heat-treated under a high temperature condition to prepare a first fired product including lithium nickel-based composite oxide and residual lithium.

The first heat-treating may be performed at a high temperature of about 750° C. to about 950° C., for example, about 800° C. to about 900° C. In the first heat-treating, a rate of temperature-increase may be about 1° C./min to about 5° C./min, for example, about 3° C./min. The first heat-treating time may be selected depending on the first heat-treating temperature and the like, and may be, for example, about 3 hours to about 10 hours.

The first heat-treating may be performed under an oxidizing gas atmosphere having an oxygen content of about 40 volume % to about 100 volume %.

The obtained first fired product may be mixed with the lithium nickel-based composite oxide, the manganese-based oxide, and the fluorine-based organic material in a set or predetermined mole ratio to obtain a second mixture.

The mixing may be dry mixing, or may be performed using a mixer (e.g., a wet mixer), and/or the like. In some embodiments, the dry mixing may be performed by milling.

The manganese-based oxide may be mixed in an amount of about 0.25 mol to about 1.5 mol, for example, about 0.25 mol to about 0.5 mol based on 100 mol of the lithium nickel-based composite oxide.

In addition, the fluorine-based organic material may be mixed in an amount of about 0.25 mol to about 1.0 mol, for example, about 0.25 mol to about 0.5 mol based on 100 mol of the lithium nickel-based composite oxide.

When the mole ratios of the lithium nickel-based composite oxide and the manganese-based oxide and the fluorine-based organic material are in the above-described ranges, the amount of unreacted residual lithium may be reduced, and the capacity characteristics and structure stability of the battery may be effectively improved.

In some embodiments, the second mixture may further include a lithium source. When the metal hydroxide precursor has a low nickel content, the amount of the residual lithium may be small, and accordingly, the same lithium source as that used in the first mixture may be added to the second mixture.

The second mixture is subjected to the second heat-treating to prepare the second fired product.

The second heat-treating may be performed, for example, at about 350° C. to about 450° C., and for example, at about 400° C. The rate of temperature-increase may be about 1° C./min to about 5° C./min, for example, about 3° C./min. The second heat-treating time may be selected depending on the second heat-treating temperature, and may be, for example, about 3 hours to 10 hours. When the second heat-treating temperature is within the above-described ranges, the amount of unreacted residual lithium may be reduced, and gas generation may be decreased by reducing a side reaction of a positive active material with an electrolyte solution.

The second heat-treating may be performed under an oxidizing gas atmosphere including about 40 volume % to about 100 volume % of oxygen, similar to the first heat-treating.

One or more embodiments of the present disclosure provide a rechargeable lithium battery including a positive electrode including the positive active material, a negative electrode, and an electrolyte.

The positive electrode and the negative electrode according to embodiments of the present disclosure may be manufactured by applying a composition for forming a positive active material layer and a composition for forming a negative active material layer respective current collectors, and drying each composition.

The composition for forming the positive active material layer may be prepared by mixing a positive active material, a conductive agent, a binder, and a solvent, where the positive active material is the same as described above.

The binder is a component that assists in binding of the active material to the conductive agent and to the current collector. Non-limiting examples of the binder may include polyvinylidene fluoride, polyvinyl alcohol, carboxylmethyl cellulose (CMC), starch, hydroxypropyl cellulose, regenerated cellulose, polyvinylpyrrolidone, tetrafluoroethylene, polyethylene, polypropylene, an ethylene-propylene-diene terpolymer (EPDM), sulfonated EPDM, a styrene butadiene rubber, a fluoro rubber, and various copolymers. An amount of the binder may be about 2 to about 5 parts by weight based on a total weight of 100 parts by weight of the positive active material. When the amount of the binder is in the above-described range, a binding force of the active material layer to the current collector is improved.

The conductive agent is not particularly limited as long as it has electrical conductivity without causing unwanted chemical changes in a battery, and may be, for example, graphite (such as natural graphite and/or artificial graphite); a carbon-based material (such as carbon black, acetylene black, ketjen black, channel black, furnace black, lamp black, thermal black, and/or the like); a conductive fiber (such as a carbon fiber and/or a metal fiber); carbon fluoride; a metal powder (such as aluminum and/or a nickel powder); a conductive whisker (such as zinc oxide and/or potassium titanate); a conductive metal oxide (such as titanium oxide); and/or a conductive material (such as a polyphenylene derivative). An amount of the conductive agent may be about 2 to about 5 parts by weight based on a total weight of 100 parts by weight of the positive active material. When the amount of the conductive agent is in the above-described range, the conductivity of the finally obtained electrode may be improved.

Non-limiting examples of the solvent include N-methylpyrrolidone and the like. When the amount of the solvent is in the above-described range, the active material layer may be easily formed.

The positive current collector may be about 3 μm to about 500 μm thick, and is not particularly limited if it has high conductivity without causing unwanted chemical changes in the battery. Non-limiting examples of the material used to form the positive current collector include stainless steel, aluminum, nickel, titanium, heat-treated carbon, and aluminum or stainless steel which is surface-treated with carbon, nickel, titanium, silver, and/or the like. The current collector may include a fine concavo-convex texture on its surface to enhance adherence of positive active materials, and may be in various forms such as films, sheets, foils, nets, porous bodies, foams and nonwoven fabric bodies.

The composition for forming a negative active material layer may be separately prepared by mixing a negative active material, a binder, a conductive agent, and a solvent. The negative active material is a material capable of intercalating and releasing lithium ions. Non-limiting examples of the negative active material may include a carbon-based material (such as graphite and/or carbon), a lithium metal, an alloy thereof, and a silicon oxide-based material. In some embodiments, silicon oxide may be used.

In some embodiments, the positive active material may be a mixture of a large-diameter active material and a small-diameter active material. As described above, when a mixture of the large-diameter active material and the small-diameter active material is used as the positive active material, the capacity of the lithium secondary battery may be further increased.

The large-diameter active material may have an average particle diameter (D50) of about 10 μm to about 20 μm, and the small-diameter active material may have an average particle diameter (D50) of about 2 μm to about 9 μm. When the large-diameter active material and the small-diameter active material have average particle diameters within the foregoing ranges, a particle distribution having an appropriate or suitable density (g/cc) may be provided. In this case, the large-diameter active material and the small-diameter active material may be mixed to a weight ratio of about 70:30 to about 90:10. When the mixing ratio of the large-diameter active material and small-diameter active material is within the above-described range, the positive active material may form a positive electrode layer having a suitable or very high density (g/cc).

The binder, the conductive agent, and the solvent may be the same materials as used in the positive electrode. The binder may be added in an amount of about 1 to about 50 parts by weight based on a total weight of 100 parts by weight of the negative active material. The conductive agent may be added in an amount of about 1 to about 5 parts based on a total weight of 100 parts by weight of the negative active material. When the amount of the conductive agent is in the above-described range, the conductivity characteristics of the finally obtained electrode may be improved. An amount of the solvent may be about 1 to about 10 parts by weight based on 100 parts by weight of the negative active material. When the amount of the solvent is in the above-described range, the negative active material layer may be easily formed.

The negative current collector may be about 3 μm to about 500 μm thick. The negative current collector is not particularly limited if it has high conductivity without causing unwanted chemical changes in the battery and may be, for example, copper, stainless steel, aluminum, nickel, titanium, heat-treated carbon, copper and/or stainless steel that is surface-treated with carbon, nickel, titanium, silver, and/or the like, an aluminum-cadmium alloy, and/or the like. In addition, the negative current collector may include a fine concavo-convex texture on its surface to enhance adherence of negative active materials, and may be in various forms such as films, sheets, foils, nets, porous bodies, foams and nonwoven fabric bodies, like the positive current collector.

A separator may be disposed between the positive electrode and the negative electrode. The separator may have a pore diameter of about 0.01 μm to about 10 μm and a thickness of about 5 μm to about 300 μm. Non-limiting examples of material for forming the separator may include polypropylene, an olefin based polymer (such as polyethylene); and a sheet made of a glass fiber or a non-woven fabric. When a solid electrolyte such as a polymer is used as the electrolyte, a solid electrolyte may also serve as a separator.

The electrolyte may be a non-aqueous electrolyte including a non-aqueous solvent and a lithium salt, an organic solid electrolyte, an inorganic solid electrolyte, and/or the like. The non-aqueous solvent may be, for example, an aprotic organic solvent (such as N-methyl-2-pyrrolidinone, propylene carbonate, ethylene carbonate, butylene carbonate, dimethyl carbonate, diethyl carbonate, gamma-butyro lactone, 1,2-dimethoxyethane, 2-methyl tetrahydrofuran, dimethylsulfoxide, 1,3-dioxolane, formamide, N,N-dimethyl formamide, dioxolane, acetonitrile, nitromethane, methyl formate, methyl acetate, phosphoric acid triester, trimethoxy methane, a dioxolane derivative, sulfolane, methyl sulfolane, 1,3-dimethyl-2-imidazolidinone, a propylene carbonate derivative, a tetrahydrofuran derivative, ether, methyl propionate, ethyl propionate, and/or the like). The lithium salt is a material that is dissolved in the non-aqueous electrolyte, and non-limiting examples thereof include LiCl, LiBr, LiI, LiClO$_4$, LiBF$_4$, LiB$_{10}$Cl$_{10}$, LiPF$_6$, LiCF$_3$SO$_3$, LiCF$_3$CO$_2$, LiAsF$_6$, LiSbF$_6$, LiAlCl$_4$, CH$_3$SO$_3$Li, CF$_3$SO$_3$Li, (CF$_3$SO$_2$)$_2$NLi, lithium chloroborate, lower aliphatic lithium carboxylate, tetraphenyl lithium borate, LiFSI (lithium fluorosulfonyl imide), and/or the like.

The organic solid electrolyte may be a polyethylene derivative, a polyethylene oxide derivative, a polypropylene oxide derivative, a phosphoric acid ester polymer, polyester sulfide, polyvinyl alcohol, polyvinylidene fluoride, and/or the like.

The inorganic solid electrolyte may be Li$_3$N, LiI, Li$_5$NI$_2$, Li$_3$N—LiI—LiOH, LiSiO$_4$, LiSiO$_4$—LiI—LiOH, Li$_2$SiS$_3$, Li$_4$SiO$_4$, Li$_4$SiO$_4$—LiI—LiOH, Li$_3$PO$_4$—Li$_2$S—SiS$_2$, and/or the like.

Figure 2:
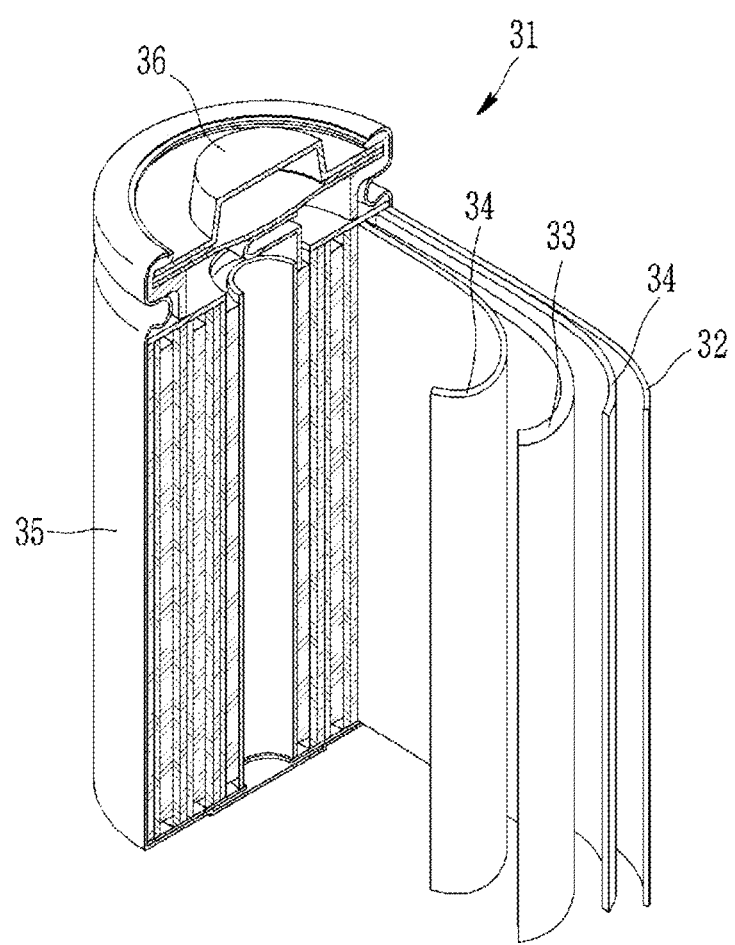
FIG. 2 is a perspective schematic view of a representative rechargeable lithium battery.

FIG. 2 is a perspective schematic view of a representative rechargeable lithium battery.

Referring to FIG. 2, a rechargeable lithium battery 31 includes a positive electrode 33 including the positive active material according to an embodiment of the present disclosure, a negative electrode 32, and a separator 34. The positive electrode 33, the negative electrode 32, and the separator 34 are wound or folded to be housed in a battery case 35. Then, an organic electrolyte solution is injected and sealed in the battery case 35 with a cap assembly 36 to complete a rechargeable lithium battery 31. The battery case 35 may be cylindrical, prismatic, thin film-type (format), and/or the like.

The rechargeable lithium battery may be a lithium ion battery.

The separator may be disposed between the positive electrode and the negative electrode, and wound or laminated to form an electrode assembly. The electrode assembly is housed in the case, impregnated with the organic electrolyte solution, and sealed to complete manufacture of the rechargeable lithium battery.

In some embodiments, the rechargeable lithium battery may be incorporated into a battery pack with a circuit, and a single pack or multiple packs may be used for devices requiring high capacity and high power, as needed. For example, the battery pack(s) may be used for a laptop, a smart phone, electric vehicle, and so on. In addition, the rechargeable lithium battery may have excellent storage stability, cycle-life characteristics, and high-rate characteristics at high temperatures, and thus may be used in an electric vehicle (EV). For example, the rechargeable lithium battery may be used for a hybrid vehicle such as a plug-in hybrid electric vehicle (PHEV).

Example embodiments of the present disclosure will be explained in more detail in the following examples and comparative examples. It is to be understood, however, that the examples are for the purpose of illustration, and are not to be construed as limiting the present invention.

EXAMPLES

Example 1

Example 1-1: Synthesis of Metal Hydroxide Precursor (Ni$_{0.6}$Co$_{0.2}$Mn$_{0.2}$(OH)$_2$)

In the following preparing process, nickel (II) sulfate, cobalt (II) sulfate, and manganese (II) sulfate were used as metal raw materials for forming the metal hydroxide precursors.

First Process: 1.5 kW/m$^3$, NH$_3$·H$_2$O 0.30 M, pH 10 to 11, Reaction Time 6 Hours First, ammonia water (NH$_3$·H$_2$O) having a concentration of 0.30 M was put in a reactor. Metal raw materials and a complex agent (ammonia water) were added thereto at 90 mL/min and 10 mL/min, respectively, at 50° C. under an agitation power of 1.5 kW/m$^3$. NaOH was added thereto to maintain pH (e.g., maintain a pH between 10 to 11), while the reaction was performed for 6 hours. The core particles obtained as a product of the reaction had an average size (diameter) of about 5.5 μm to 6.5 μm, and were used in a second process.

Second Process: 1.0 kW/m$^3$, NH$_3$·H$_2$O 0.35 M, pH 10 to 11, Reaction Time 6 Hours The metal raw materials and the complex agent were added to the reactor at 100 mL/min and 15 mL/min, respectively, so that a concentration of the complex agent was 0.35 M while the reaction temperature was maintained at 50° C. NaOH was added thereto in order to maintain pH (e.g., maintain a pH between 10 to 11) while the reaction was performed for 6 hours. Herein, the reaction was performed by lowering the agitation power by 1.0 kW/m$^3$ compared to the first process. Particles having a core and an intermediate layer produced from this reaction had an average size of 9 μm to 10 μm, and then, a third process was performed as follows.

Third Process: 1.0 kW/m$^3$, NH$_3$·H$_2$O 0.40 M, pH 10 to 11, Reaction Time 4 Hours The metal raw and the complex agent were added to the reactor at 150 mL/min and 20 mL/min, respectively, so that a concentration of the complex agent was 0.40 M while the reaction temperature was maintained at 50° C. NaOH was added thereto in order to maintain pH (e.g., maintain a pH between 10 to 11) while the reaction was performed for 4 hours. Herein, the agitation power was the same as used in the second process.

Post Process

As for a post process, the resulting material was washed and hot air-dried at about 150° C. for 24 hours to obtain a metal hydroxide precursor ($Ni_{0.6}Co_{0.2}Mn_{0.2}(OH)_2$).

Example 1-2: Preparation of Positive Active Material

The metal hydroxide precursor ($Ni_{0.6}Co_{0.2}Mn_{0.2}(OH)_2$) obtained according to Example 1-1 was mixed with lithium hydroxide (LiOH) to have a mole ratio of 1:1 Li:(Ni+Co+Mn) using a high speed mixer at 2,000 rpm, and then first heat-treated at about 860° C. for 8 hours under an oxidizing gas atmosphere including an oxygen concentration of 95% to obtain a lithium nickel-based composite oxide ($LiNi_{0.6}Co_{0.2}Mn_{0.2}O_2$).

The lithium nickel-based composite oxide, manganese (III) oxide ($Mn_2O_3$), and polyvinylidene fluoride (PVdF) were dry-mixed in a mole ratio of 1:0.005:0.0025 using a high speed mixer at 2,000 rpm, and second heat-treated at about 400° C. for 6 hours under an oxidizing gas atmosphere including an oxygen concentration of 95% to obtain a positive active material.

Example 1-3: Manufacture of Coin Cell

The positive active material according to Example 1-2, a carbon black carbon conductive agent (Product name: Denka Black, Denka Korea Co., Ltd.), and polyvinylidene fluoride (PVdF) were mixed in a weight ratio of 92:4:4, and the obtained mixture was mixed with N-methylpyrrolidone (NMP) to prepare slurry. The slurry was bar-coated on a 15 μm-thick aluminum current collector, vacuum-dried at room temperature, dried again at 120° C., compressed, and punched to manufacture a 45 μm-thick positive electrode plate.

The manufactured electrode plate, a lithium metal as a counter electrode, a PTFE separator, and an electrolyte solution prepared by dissolving 1.5 M $LiPF_6$ in a mixed solvent of EC (ethylene carbonate), DEC (diethyl carbonate), and EMC (ethylmethyl carbonate) (a volume ratio of 2:4:4) were used to manufacture a coin cell.

Example 2

A coin cell was manufactured according to substantially the same method as Example 1, except that in Example 1-2, the lithium nickel-based composite oxide, the manganese (III) oxide ($Mn_2O_3$), and the polyvinylidene fluoride (PVdF) were mixed in a mole ratio of 1:0.005:0.005 to prepare a metal hydroxide precursor and subsequently, a positive active material.

Comparative Example 1

A coin cell was manufactured according to substantially the same method as Example 1, except that in Example 1-2, the manganese (III) oxide ($Mn_2O_3$) and the polyvinylidene fluoride (PVdF) were omitted (e.g., not added to the lithium nickel-based composite oxide) to prepare a metal hydroxide precursor and subsequently, a positive active material.

Comparative Example 2

A coin cell was manufactured according to substantially the same method as Example 1, except that in Example 1-2, the lithium nickel-based composite oxide and the polyvinylidene fluoride (PVdF) were mixed in a mole ratio of 1:0.0074 without adding the manganese (III) oxide ($Mn_2O_3$) to prepare a metal hydroxide precursor and subsequently, a positive active material.

Comparative Example 3

A coin cell was manufactured according to substantially the same method as Example 1, except that in Example 1-2, the lithium nickel-based composite oxide and the manganese (III) oxide ($Mn_2O_3$) were mixed in a mole ratio of 1:0.005 without adding the polyvinylidene fluoride (PVdF) to prepare a metal hydroxide precursor and subsequently, a positive active material.

Comparative Example 4

An ammonia solution having a concentration of 0.5 mol/L was put in a reactor, and a reaction was started at an agitation speed of 250 rpm and a reaction temperature of 50° C. Subsequently, a metal raw material at 6 L/hr and an ammonia solution at 1.35 L/hr were concurrently or simultaneously added thereto, and NaOH as a pH controller was added thereto to adjust pH into a range of 11.4 to 11.6.

When the reaction was stabilized after performing the reaction for 33 hours, an overflowing reactant was collected. Herein, the metal raw material was dissolved in a sulfuric acid aqueous solution to have a ratio of nickel:cobalt:manganese=6:2:2. The reactant was washed using a filter press until the conductivity of water discharged from the washing became less than or equal to 20 μS/cm. The washed reactant was hot air-dried at about 150° C. for 24 hours to obtain a metal hydroxide precursor ($Ni_{0.6}Co_{0.2}Mn_{0.2}(OH)_2$).

A positive active material was prepared according to substantially the same method as Example 1 and used to manufacture a coin cell, except that the metal hydroxide precursor prepared in the aforementioned method was used.

Evaluation Example 1: Evaluation of Residual Lithium Content

Each residual lithium content of the positive active material according to Examples 1 and 2 and Comparative Examples 1 to 4 was measured and provided in Table 1.

The content of unreacted residual lithium present on the surfaces of each positive active material was measured using an HCl titration method; detailed measuring methods are as follows. 10 g of a positive active material was put in distilled water and stirred at 300 rpm for 30 minutes, and then, an aliquot of solution was taken therefrom, and a pH change thereof was measured while HCl was added thereto. Since the unreacted residual lithium was present as $Li_2CO_3$ and LiOH (having a 1:1 ratio of $Li^+$ to $CO_3^{2-}$ and $OH^-$ counter-anions), HCl was added to react with the $CO_3^{2-}$ and $OH^-$ ions to reach a titration point, and the content of unreacted residual lithium could be calculated from the amount of the added HCl solution.

TABLE 1

| | Residual lithium content (ppm) (Li content in $Li_2CO_3$ & LiOH) |
|---|---|
| Example 1 | 966 |
| Example 2 | 963 |
| Comparative Example 1 | 1511 |

TABLE 1-continued

| | Residual lithium content (ppm)<br>(Li content in $Li_2CO_3$ & LiOH) |
|---|---|
| Comparative Example 2 | 1050 |
| Comparative Example 3 | 1030 |
| Comparative Example 4 | 950 |

Referring to Table 1, the positive active materials according to Examples 1 and 2 had sharply reduced unreacted residual lithium as a result of including lithium manganese-based composite oxide, and concurrently or simultaneously forming a surface-modifying layer including lithium fluoride on the surface of the lithium nickel-based composite oxide.

In contrast, the positive active material of Comparative Example 1 included the lithium nickel-based composite oxide alone and showed no residual lithium removal effect. Since Comparative Example 2 included the surface-modifying layer including lithium fluoride on the surface of the lithium nickel-based oxide in the positive active material, and Comparative Example 3 included the lithium nickel-based composite oxide and lithium manganese-based composite oxide alone in the positive active material, the residual lithium removal effect was deteriorated compared with Examples 1 and 2.

Meanwhile, Comparative Example 4 included no secondary particles having a developed surface orientation in the positive active material, and thus showed a small amount of residual lithium on the surface of the positive active material.

Evaluation Example 2: Evaluation of Gas Generation Amount at High Temperature (80° C.)

The coin cells according to Example 1 and Comparative Examples 1 to 3 were charged to a voltage of 4.3 V (vs. Li) under a constant current of 0.1 C at 25° C., followed by charging to a 0.05 C cut off while maintaining a constant voltage of 4.3 V (e.g., CC-CV charge mode). Subsequently, the coin cells were disassembled, and the positive electrode plates separated therefrom were placed in respective pouches filled with electrolyte solution, and then stored in an 80° C. oven. A mass change of each pouch was determined from the volume change using an Archimedes (e.g., volume displacement) method, and the results are shown in FIG. 3.

The electrolyte solution was prepared by dissolving 1.5 M $LiPF_6$ in a mixed solvent of EC (ethylene carbonate), DEC (diethyl carbonate), and EMC (ethylmethyl carbonate) (a volume ratio of 2:4:4).

The Archimedes method measures the gas generation amount by measuring a weight of the pouch in a water tank filled with water and converting a weight change into the volume change. The weight of each pouch was measured repeatedly using a fixed period (e.g., 4 days).

Figure 3:
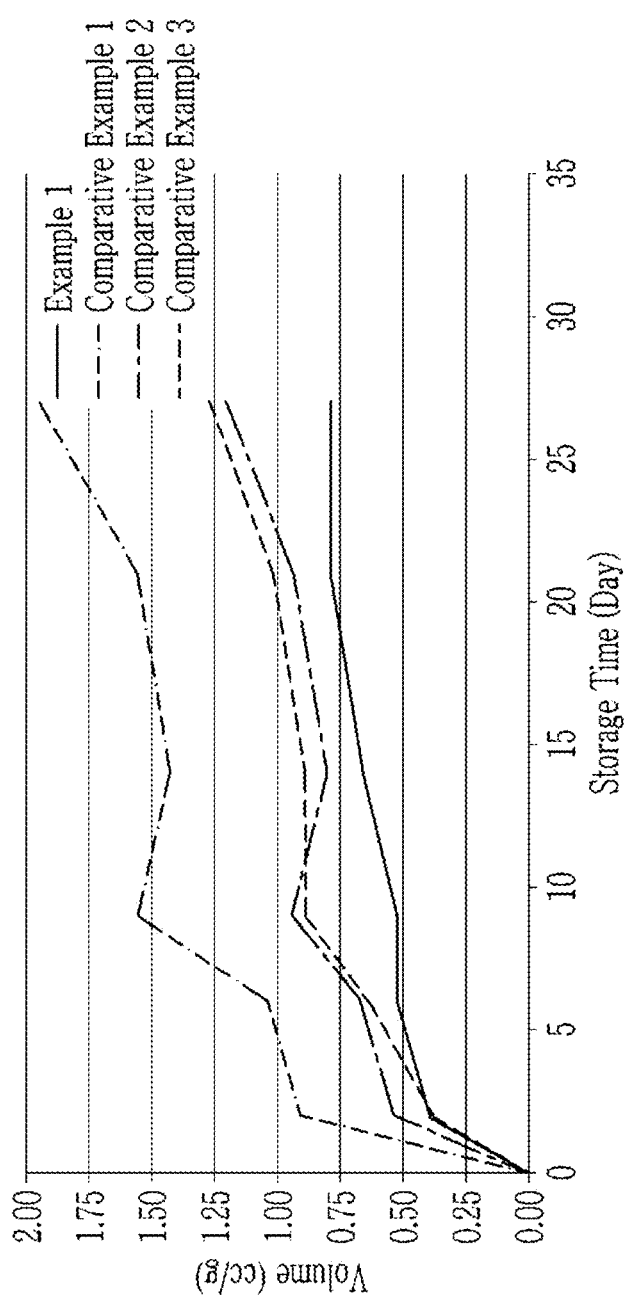
FIG. 3 is a graph showing cumulative gas generation amounts over time during high temperature storage of the coin cells according to Example 1 and Comparative Examples 1 to 3.

Referring to FIG. 3, the coin cell of Example 1 showed reduced gas generation compared with the coin cells of Comparative Examples 1 to 3.

Evaluation Example 3: Evaluation of Charge and Discharge Characteristics

The coin cells according to Examples 1 and 2 and Comparative Examples 1 to 4 were charged to a voltage of 4.3 V (vs. Li) under a constant current of 0.1 C at 25° C., followed by charging to a 0.05 C cut off while maintaining a constant voltage of 4.3 V. Subsequently, the coin cells were discharged at 0.1 C to a voltage of 3.0 V (vs. Li) under constant current conditions ($1^{st}$ cycle). After the $1^{st}$ cycle, the coin cells were charged to 4.3 V (vs. Li) under a constant current condition of 0.2 C at 25° C., followed by charging to a 0.05 C cut off while maintaining a constant voltage of 4.3 V. Subsequently, the coin cells were discharged at 0.2 C to a voltage of 3.0 V (vs. Li) under constant current conditions ($2^{nd}$ cycle). After the $2^{nd}$ cycle, the coin cells were charged to a voltage of 4.3 V (vs. Li) under a constant current condition of 0.5 C at 25° C., followed by charging to a 0.05 C cut off while maintaining a constant voltage of 4.3 V. Subsequently, the coin cells were discharged at 0.2 C to a voltage of 3.0 V (vs. Li) under the constant current condition ($3^{rd}$ cycle). In the following cycles ($3^{rd}$ to $7^{th}$ cycles), the coin cells were charged as in the $3^{rd}$ cycle, and then discharged at 0.33 C ($4^{th}$ cycle), 0.5 C ($5^{th}$ cycle), 1.0 C ($6^{th}$ cycle), and 2.0 C ($7^{th}$ cycle). In all the charge and discharge cycles, a pause of 10 minutes was set after each charge/discharge cycle. The initial charge and discharge experiment result, initial charge and discharge efficiency according to Equation 1, and rate capability are shown in Table 2.

Initial charge and discharge efficiency (I.C.E)=[first discharge capacity/first charge capacity]×100   Equation 1

TABLE 2

| | 1st cycle | | | Rate capability (mAh/g) | | | | |
|---|---|---|---|---|---|---|---|---|
| | Charge capacity (mAh/g) | Discharge capacity (mAh/g) | Efficiency (%) | 0.2 C | 0.33 C | 0.5 C | 1 C | 2 C |
| Example 1 | 197.6 | 188.7 | 95.5 | 183.2 | 180.7 | 179.7 | 174.3 | 167.3 |
| Example 2 | 197.5 | 187.8 | 95.1 | 182.2 | 179.9 | 174.5 | 167.8 | 163.2 |
| Comparative Example 1 | 197.1 | 185.9 | 94.3 | 183.1 | 180.3 | 178.2 | 172.7 | 166.1 |
| Comparative Example 2 | 197.6 | 185.5 | 93.9 | 182.8 | 179.8 | 177.1 | 171.5 | 164.1 |
| Comparative Example 3 | 197.6 | 188.4 | 95.3 | 185.3 | 182.3 | 179.6 | 173.4 | 165.6 |
| Comparative Example 4 | 196.9 | 176.2 | 89.5% | 173.0 | 170.1 | 167.4 | 162.3 | 156.3 |

Referring to Table 2, the coin cells including the positive active materials according to Examples 1 and 2 exhibited improved or at least comparable initial charge and discharge efficiency and rate capability characteristics compared with the coin cells including the positive active material including lithium nickel-based composite oxide alone according to Comparative Example 1, the positive active material having a modifying layer including lithium fluoride on the surface of the lithium nickel-based composite oxide according to Comparative Example 2, and the positive active material including a mixture of lithium nickel-based oxide and lithium manganese composite oxide according to Comparative Example 3.

In contrast, the positive active material according to Comparative Example 4 included no secondary particles having a developed surface orientation, and thus showed low initial charge and discharge efficiency and relatively small capacity compared with the Examples.

Figure 4:
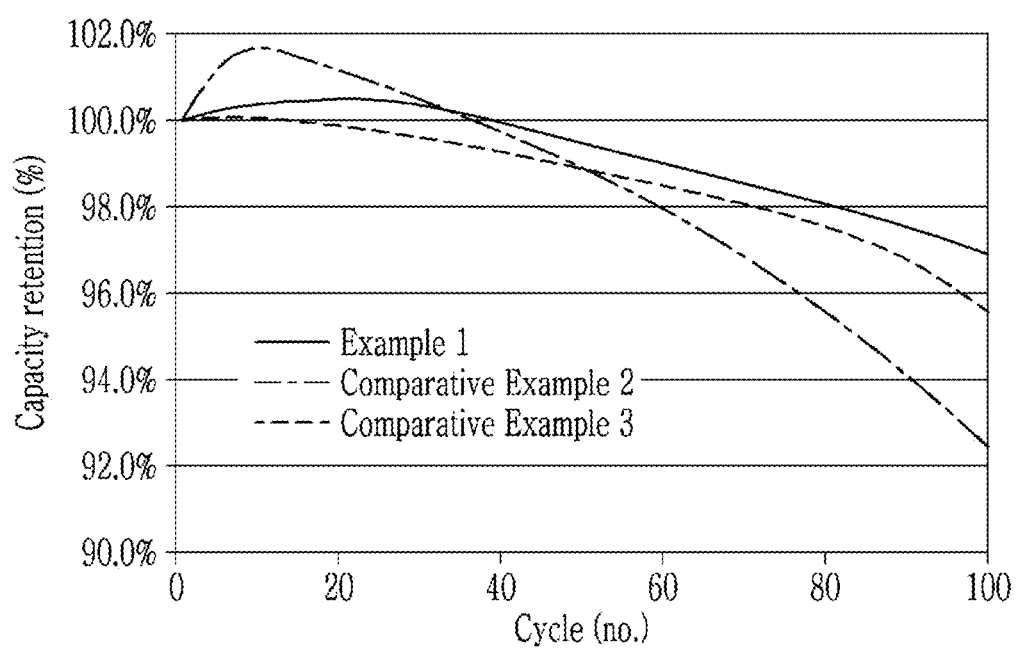
FIG. 4 is a graph showing high temperature cycle-life characteristics of the coin cells manufactured in Example 1, Comparative Example 2, and Comparative Example 3.

Evaluation Example 4: Evaluation of Cycle-life Characteristics at High Temperature After the $1^{st}$ cycle in Evaluation Example 3, the coin cells were charged to a voltage of 4.3 V (vs. Li) under a constant current of 1.0 C at 45° C., followed by charging to a 0.05 C cut off while maintaining a constant voltage of 4.3 V. Subsequently, the coin cells were discharged to a voltage of 3.0 V (vs. Li) under a constant current of 1.0 C, and this cycling program was repeated up to 100 cycles. A pause (rest) of 10 minutes was set after every charge/discharge cycle. The cycle capacity retention results are shown in FIG. 4, and a $100^{th}$ cycle capacity retention calculated according to Equation 2 and a capacity decrease rate at the $100^{th}$ cycle relative to the $10^{th}$ cycle calculated according to Equation 3 are shown in Table 3.

Capacity retention at $100^{th}$ cycle [%]=[discharge capacity at $100^{th}$ cycle/discharge capacity at $1^{st}$ cycle]×100  Equation 2

Capacity decrease rate [%] at $100^{th}$ cycle relative to $10^{th}$ cycle=[(discharge capacity at $10^{th}$ cycle−discharge capacity at $100^{th}$ cycle)/discharge capacity at $10^{th}$ cycle]×100  Equation 3

TABLE 3

| | Capacity retention (%) at $100^{th}$ cycle | Capacity decrease rate (%) at $100^{th}$ cycle relative to $10^{th}$ cycle capacity |
|---|---|---|
| Example 1 | 96.8 | 3.46 |
| Comparative Example 2 | 92.5 | 9.05 |
| Comparative Example 3 | 95.6 | 4.46 |

Referring to Table 3 and FIG. 4, Example 1 exhibited excellent high temperature cycle-life characteristics by effectively removing a lithium byproduct on the surface of the lithium nickel-based composite oxide having the surface orientation of Comparative Example 1 compared with Comparative Examples 2 and 3.

In addition, Example 1 exhibited an improved capacity decrease rate of the $100^{th}$ cycle relative to the $10^{th}$ cycle as well as an improved $100^{th}$ cycle capacity retention compared with Comparative Examples 2 and 3.

Evaluation Example 5: XPS (X-ray Photoelectron Spectroscopy) Analysis and TOF-SIMS (Time-of-Flight Secondary Ion Mass Spectrometry) Analysis X-ray photoelectron spectroscopy (XPS) binding energy peaks (spectra) of the positive active materials according to Example 1 and Comparative Example 1 were measured, and the surfaces thereof were analyzed using Time of Flight-Secondary Ion Mass Spectrometry (TOF-SIMS). The analysis results are shown in FIGS. 5 and 6.

Figure 5:
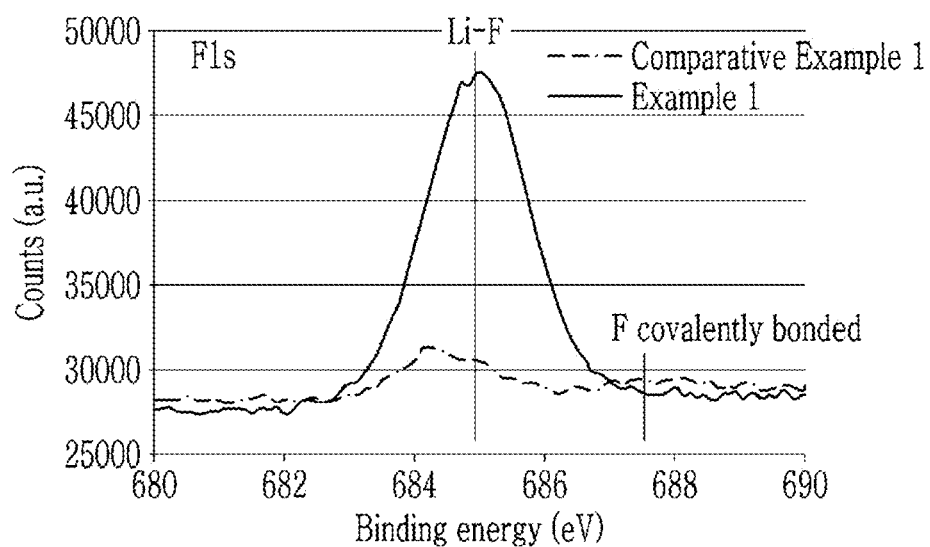
FIG. 5 is a plot of X-ray Photoelectron Spectroscopy (XPS) peaks of the positive active material prepared in Example 1 and Comparative Example 1.

Referring to FIG. 5, the positive active material of Example 1 showed an XPS peak corresponding to the binding energy of lithium fluoride (LiF), while the positive active material of Comparative Example 1 showed no peak.

Figure 6:
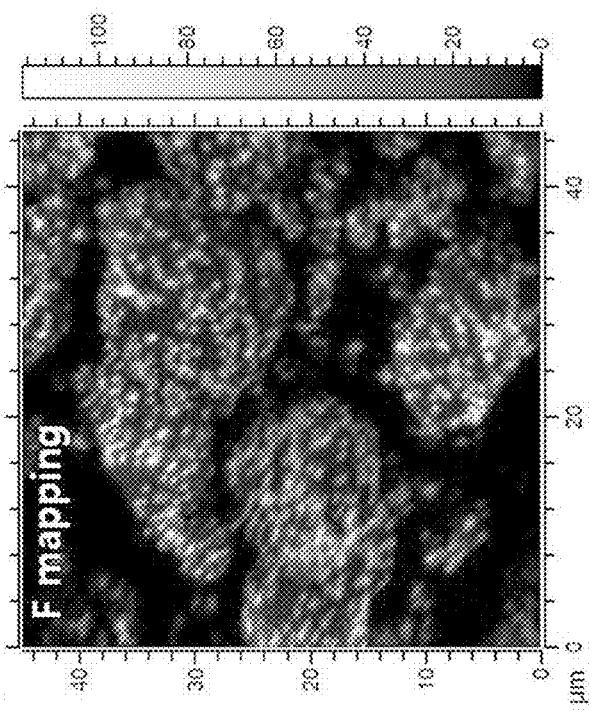
FIG. 6 is a view showing surface TOF-SIMS (Time-of-Flight Secondary Ion Mass Spectrometry) analysis results of the positive active materials prepared in Example 1 and Comparative Example 1.
Figure 6:
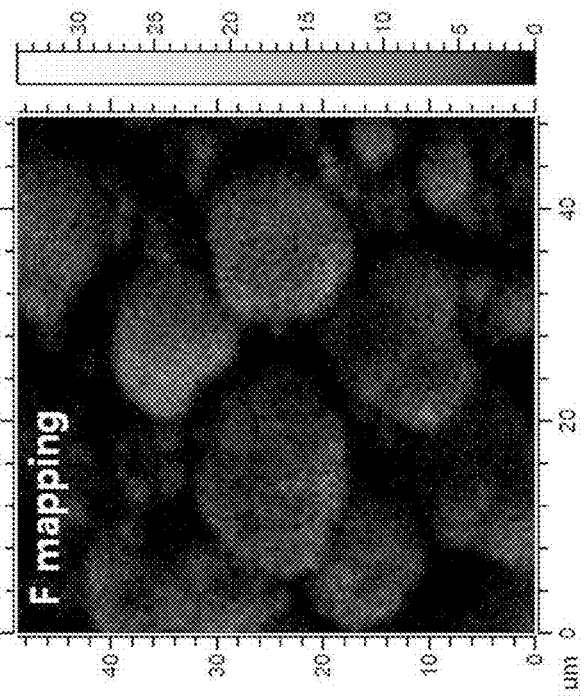

Referring to FIG. 6, fluoride (F) element mapping showed that F atoms were relatively more frequently distributed as particles on the surface of the positive active material of Example 1, compared to the surface of the positive active material of Comparative Example 1.

Referring to the results, the positive active material of Example 1 included lithium fluoride (LiF) on the surface, but the positive active material of Comparative Example 1 included almost or substantially no F element, or included F element at an impurity level.

Evaluation Example 6: Measurement of Scanning Electron Microscope (SEM) Image FIG. 7 is a scanning electron microscope (SEM) image of the positive active material prepared according to Example 1.

Figure 7:
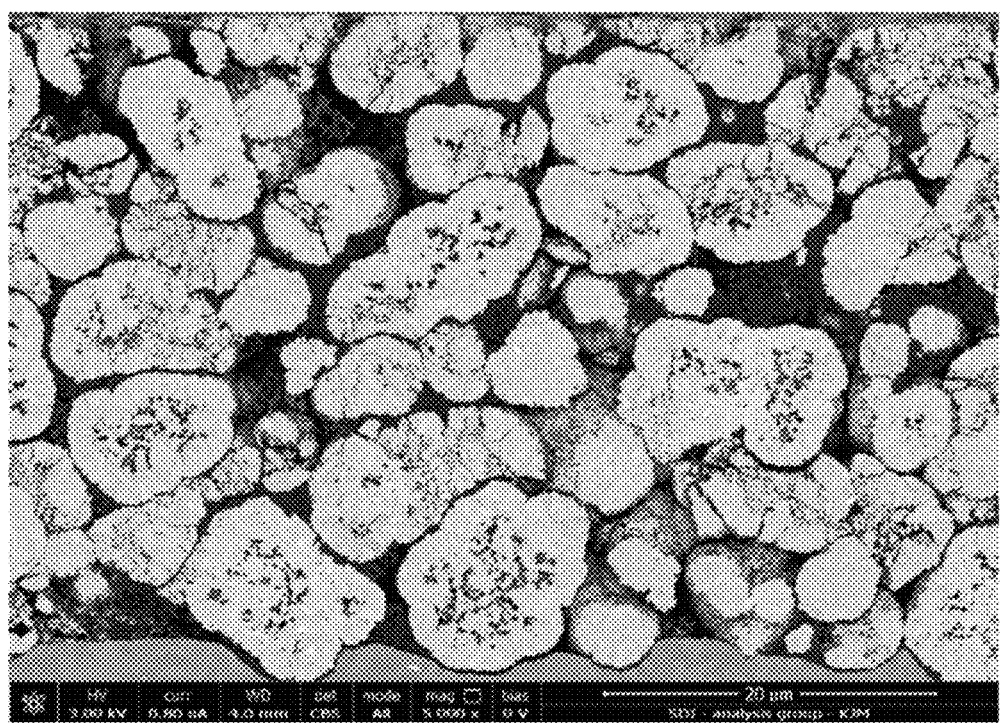
FIG. 7 is a Scanning Electron Microscope (SEM) image of the positive active material prepared in Example 1.

Referring to FIG. 7, the positive active material according to Example 1 includes a secondary particle in which a plurality of plate-shaped primary particles are agglomerated, and the secondary particle has a single-centered radial arrangement having one center or a multi-centered radial array structure having a plurality of centers.

As used herein, expressions such as "at least one of", "one of", and "selected from", when preceding a list of elements, modify the entire list of elements and do not modify the individual elements of the list. Further, the use of "may" when describing embodiments of the present disclosure refers to "one or more embodiments of the present disclosure".

In addition, as used herein, the terms "use", "using", and "used" may be considered synonymous with the terms "utilize", "utilizing", and "utilized", respectively.

As used herein, the terms "substantially", "about", and similar terms are used as terms of approximation and not as terms of degree, and are intended to account for the inherent deviations in measured or calculated values that would be recognized by those of ordinary skill in the art.

Also, any numerical range recited herein is intended to include all sub-ranges of the same numerical precision subsumed within the recited range. For example, a range of "1.0 to 10.0" is intended to include all subranges between (and including) the recited minimum value of 1.0 and the recited maximum value of 10.0, that is, having a minimum value equal to or greater than 1.0 and a maximum value equal to or less than 10.0, such as, for example, 2.4 to 7.6. Any maximum numerical limitation recited herein is intended to include all lower numerical limitations subsumed therein and any minimum numerical limitation recited in this specification is intended to include all higher numerical limitations subsumed therein. Accordingly, Applicant reserves the right to amend this specification, including the claims, to expressly recite any sub-range subsumed within the ranges expressly recited herein.

While this invention has been described in connection with what is presently considered to be practical example embodiments, it is to be understood that the invention is not limited to the disclosed embodiments. On the contrary, it is intended to cover various modifications and equivalent

DESCRIPTION OF SOME OF THE SYMBOLS

| 10: primary particle | 20: secondary particle |
|---|---|
| 31: rechargeable lithium battery | 32: negative electrode |
| 33: positive electrode | 34: separator |
| 35: battery case | 36: cap assembly |

What is claimed is:

1. A positive active material for a rechargeable lithium battery, comprising:
a lithium nickel-based composite oxide and a lithium manganese composite oxide, and
a surface-modifying layer comprising lithium fluoride on a surface of the lithium nickel-based composite oxide,
the lithium nickel-based composite oxide comprising a secondary particle in which a plurality of plate-shaped primary particles are agglomerated,
the secondary particle has
a structure having one center with the primary particles arranged radially around the one center, or
a structure having a plurality of centers with the primary particles arranged radially around the plurality of centers, and
(003) planes of the primary particles are oriented normal to an intersecting portion of an outer surface of the secondary particle, and
the lithium manganese composite oxide having two or more types of crystal lattice structures,
wherein the lithium manganese composite oxide is on the surface of the lithium nickel-based composite oxide and is mixed with the surface-modifying layer comprising lithium fluoride into a mixture,
the lithium manganese composite oxide has a cubic crystal lattice structure and a monoclinic crystal lattice structure, and
the lithium manganese composite oxide is included in an amount of 0.4 mol to 1.5 mol based on 100 mol of the lithium nickel-based composite oxide.

2. The positive active material of claim 1, wherein the lithium nickel-based composite oxide has a porosity of 1% to 8%.

3. The positive active material of claim 1, wherein the positive active material comprises 1,000 ppm or less of unreacted residual lithium at the surface thereof.

4. The positive active material of claim 3, wherein the positive active material comprises 1,000 ppm or less of unreacted residual lithium at the surface of the lithium nickel-based composite oxide.

5. The positive active material of claim 1, wherein the lithium nickel-based composite oxide has a specific surface area of 0.4 m²/g to 1.0 m²/g.

6. The positive active material of claim 1, wherein the lithium manganese composite oxide is represented by Chemical Formula 1:

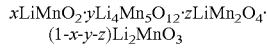

Chemical Formula 1 wherein, in Chemical Formula 1, $0 \leq x < 1$, $0 < y < 1$, $0 \leq z < 1$, $0 < y+z < 1$, and $0 < x+y+z < 1$.

7. The positive active material of claim 1, wherein the lithium manganese composite oxide has the cubic crystal lattice structure, the monoclinic crystal lattice structure, and an orthorhombic crystal lattice structure.

8. The positive active material of claim 7, wherein:
the lithium manganese composite oxide having the cubic crystal lattice structure is at least one of $LiMn_2O_4$ and $Li_4Mn_5O_{12}$,
the lithium manganese composite oxide having the monoclinic crystal lattice structure is $Li_2MnO_3$, and
the lithium manganese composite oxide having the orthorhombic crystal lattice structure is $LiMnO_2$.

9. The positive active material of claim 1, wherein the lithium manganese composite oxide has an average particle diameter (D50) of less than or equal to 10 μm.

10. The positive active material of claim 1, wherein the lithium fluoride is in a particle shape.

11. The positive active material of claim 1, wherein the lithium fluoride is included in an amount of 0.25 mol to 1.0 mol based on 100 mol of the lithium nickel-based composite oxide.

12. A method of preparing the positive active material of claim 1, comprising:
mixing a metal hydroxide precursor and a lithium source to prepare a first mixture;
first heat-treating the first mixture under a high temperature condition to prepare a first fired product including a lithium nickel-based composite oxide and residual lithium;
mixing the first fired product with manganese-based oxide and a fluorine-based organic material to prepare a second mixture; and
second heat-treating the second mixture to prepare the positive active material of claim 1.

13. The method of claim 12, wherein the first heat-treating is performed at 750° C. to 950° C.

14. The method of claim 12, wherein the manganese-based oxide is mixed in an amount of 0.25 to 1.5 mol based on 100 mol of the lithium nickel-based composite oxide.

15. The method of claim 12, wherein the fluorine-based organic material is mixed in an amount of 0.25 to 1.0 mol based on 100 mol of the lithium nickel-based composite oxide.

16. The method of claim 12, wherein the manganese-based oxide is at least one selected from $Mn_2O_3$, MnO, and $MnO_2$.

17. The method of claim 12, wherein the fluorine-based organic material is at least one selected from polyvinylidene fluoride (PVdF), polyvinyl fluoride (PVF), and polytetrafluoro ethylene (PTFE).

18. The method of claim 12, wherein the second heat-treating is performed at 350° C. to 450° C.

19. A rechargeable lithium battery, comprising:
a positive electrode comprising the positive active material of claim 1;
a negative electrode; and
an electrolyte.

* * * * *